United States Patent
Jansen et al.

(10) Patent No.: US 6,245,304 B1
(45) Date of Patent: Jun. 12, 2001

(54) REACTOR HAVING HOLLOW FIBERS AND METHOD FOR CARRYING OUT GAS/LIQUID/SOLID PHASE REACTIONS

(75) Inventors: Albert Edward Jansen, Houten; Rob Klaassen; Jan Willem Van Heuven, both of Apeldoorn, all of (NL)

(73) Assignee: Nederlandse Organisatie voor Toegepast- Natuurwetenschappelijk Onderzoek (TNO), Delft (NL)

( * ) Notice: Subject to any disclaimer, the term of this patent is extended or adjusted under 35 U.S.C. 154(b) by 0 days.

(21) Appl. No.: 09/180,190

(22) PCT Filed: May 5, 1997

(86) PCT No.: PCT/NL97/00253
   § 371 Date: Nov. 17, 1998
   § 102(e) Date: Nov. 17, 1998

(87) PCT Pub. No.: WO97/41953
   PCT Pub. Date: Nov. 13, 1997

(30) Foreign Application Priority Data
   May 3, 1996 (NL) .................................................. 1003026

(51) Int. Cl.[7] .............................. B01J 4/04; B01J 10/00; B01J 8/22

(52) U.S. Cl. .......................... 422/198; 422/211; 422/239; 95/45; 96/8; 96/10; 210/321.8; 210/321.89; 210/500.23

(58) Field of Search ..................................... 422/236, 238, 422/239, 140, 211, 220, 231, 240, 312, 196, 197, 201; 435/295.3, 297.1, 297.2, 297.4, 297.5; 95/45; 96/8, 10; 210/151, 321.8, 321.89, 500.23, 321.65, 321.71, 288, 649, 644, 640

(56) References Cited

U.S. PATENT DOCUMENTS

| 4,789,468 | * | 12/1988 | Sirkar ................................. 210/137 |
| 5,230,796 | * | 7/1993 | Ter Meulen ...................... 210/321.8 |
| 5,248,424 | * | 9/1993 | Cote et al. ............................ 210/636 |

(List continued on next page.)

FOREIGN PATENT DOCUMENTS

| 43 08 697 | 9/1994 | (DE) . |
| 0 659 694 | 6/1995 | (EP) . |
| 51-0074888 | 6/1976 | (JP) . |
| 53-1177 | 1/1978 | (JP) . |

Primary Examiner—Hien Tran
(74) Attorney, Agent, or Firm—Young & Thompson (57) ABSTRACT

A reactor for carrying out gas/liquid/solid phase reactions, comprises a housing (1) which encloses an essentially closed reaction chamber (2) for holding a first liquid phase, the solid phase and a gas phase fed through the chamber; at least one feed (3), connected to the reaction chamber, for feeding a first liquid phase to the reaction chamber (2); at least one hollow fiber (4), the wall of which defines an internal flow channel for at least removing a second liquid phase, such that exchange of matter can take place between the reaction chamber (2) and the flow channel through the wall of hollow fiber (4); at least one discharge (6), connected to the flow channel, for removing the second liquid phase; at least one gas inlet (7) and at least one gas outlet (8), connected to reaction chamber (2) such that, in the use position, the at least one gas inlet (7) opens essentially into the bottom of the reaction chamber (2) and the at least one gas outlet (8) is located essentially at the top of the reaction chamber (2), for feeding the gas phase essentially in the upward direction through the reaction chamber (2). The invention further relates to a method for carrying out gas/liquid/solid phase reactions, using the above reactor. The hollow fibers are preferably of a ceramic material. The reactor is preferably a DAM module and/or suitable for use at elevated temperature and pressure.

21 Claims, 2 Drawing Sheets

U.S. PATENT DOCUMENTS

| | | | |
|---|---|---|---|
| 5,252,220 | * 10/1993 | Coughlin et al. | 210/644 |
| 5,407,644 | * 4/1995 | Rytter et al. | 422/147 |
| 5,468,283 | * 11/1995 | French et al. | 95/45 |
| 5,480,553 | * 1/1996 | Yamamori et al. | 210/650 |
| 5,614,065 | * 3/1997 | Marker | 202/158 |
| 5,897,997 | * 4/1999 | Louvel | 435/294.1 |
| 5,932,099 | * 8/1999 | Cote et al. | 210/605 |
| 5,989,420 | * 11/1999 | Sugimoto | 210/222 |

* cited by examiner fig-1 fig-2 fig-3 fig-4

US 6,245,304 B1

REACTOR HAVING HOLLOW FIBERS AND METHOD FOR CARRYING OUT GAS/LIQUID/SOLID PHASE REACTIONS

CROSS REFERENCE TO RELATED APPLICATION

This is the 35 USC 371 national stage of international application PCT/NL97/00253 filed on May 5, 1997, which designated the United States of America.

FIELD OF THE INVENTION

The present invention relates to a reactor for carrying out gas phase/liquid phase/solid phase reactions.

BACKGROUND OF THE INVENTION

"Gas-liquid-solid" (GLS) reactors of this type are widely used in industry, inter alia for the hydrogenation and (partial) oxidation of liquid phases, as well as for Fischer Trops reactions. In processes of this type in general the gas phase and liquid phase fed to the reactor contain the reactants and the products formed by the chemical reaction, whilst the solid phase is a catalyst material.

The GLS reactors currently used in industry are subdivided into fixed bed reactors and suspended solid phase reactors.

In the fixed bed reactors, the catalyst particles are large in size and are present in a fixed bed, through which the gas phase and the liquid phase are fed (simultaneously). The fixed bed reactors can be further subdivided into so-called "trickle bed" reactors, "co-current-upflow" reactors and "segmented bed" reactors, depending on the respective direction(s) of the liquid stream and the gas stream.

In the suspended solid reactors, small solid particles are used which are held in suspension in the liquid phase, for instance by stirring or mixing. Examples of reactors of this type are suspension reactors or fluidized bed reactors or stirred suspension reactors.

Examples of said known types of GLS reactors and specific applications thereof are given in Shah, Y. T., Gas-liquid-solid reactor design, McGraw-Hill, New York 1979.

General problems experienced when carrying out GLS reactions in said known reactors are, inter alia:

- realization of good contact or good transfer between the various phases, by means of which a rapid and/or high degree of conversion, as well as a short contact time and/or residence time in the reactor, can be obtained;
- holding the solid phase in the reactor so that said phase is not entrained by the (liquid or gaseous) product streams removed from the reactor. If the solid phase is removed from the reactor with the product stream, as in the case of suspension reactors, downstream separation steps for separating off the solid phase and means for recirculating the solid phase to the reactor are required;
- maintaining a good flow through the reactor, that is to say preventing the solid phase present in the reactor from blocking the feed or the discharge for the liquid phase and/or the gas phase to/from the reactor;
- providing an adequate contact surface on the solid phase;
- achieving optimum control of the reaction conditions (including homogeneous temperature distribution) and the degree of conversion;
- the existing GLS reactors as a rule require a downstream separation step, in which the reaction products are separated off from the product stream removed from the reactor—which product stream contains the other constituents of the reaction mixture;
- it is not possible selectively to remove reaction products from the reaction mixture and/or the reaction zone in such a way that in the case of equilibrium reactions the equilibrium is shifted to the desired product side and a higher yield and/or a higher efficiency is obtained.

A first aim of the present invention is, therefore, to provide an improved reactor for carrying out gas/liquid/solid reactions, in particular a GLS reactor of broad applicability, which is easier to operate and which makes it simpler to maintain the solid phase than, for example, (is the case with) suspension reactors.

A further aim of the present invention is to provide an improved GLS reactor which has fewer or none of the above-mentioned disadvantages.

It is known in the prior art to use hollow fibres for separation or absorption techniques, such as microfiltration, ultrafiltration and reverse osmosis, as well as dialysis, gas separation, pervaporation/vapour permeation, and installations for this purpose are described in the prior art. These processes generally relate to separation processes in which only gas phases and/or liquid phases are involved.

For instance, German Offenlegungsschrift 43 08 697 and Chemical Abstracts, Vol. 92, No. 14 (1980) describe systems for bringing liquid streams into contact, for example for mass transfer. Those systems comprise membrane modules, the first liquid stream being fed through the fibres and the second liquid stream being fed over the fibres. However, this system is not suitable for use as a GLS reactor; for instance, there is no specific reaction chamber, there is no system for holding the solid phase in suspension and there are no separate feeds for feeding the liquid phase and the gas phase to the reaction chamber.

Membrane reactors are also used for gas phase reactions, in particular gas phase reactions which are catalyzed by a catalytic solid phase which forms the walls of the fibres or is immobilized on the hollow fibre, the latter acting as a support. A system of this type is described, for example, by G. Saracco et al., Journal of Membrane Science, Volume 95, No. 2, October 1994, p. 105–123.

However, a liquid phase is not involved in reactions of this type, nor is it possible to carry out phase transfer reactions. Furthermore the catalytic solid phase is present as or on the membrane, which appreciably restricts the number of catalysts which can be used—and thus the number of reactions which can be carried out.

A process recently developed by the Applicants is membrane gas absorption. With this process constituents are absorbed from a gas phase into a liquid phase, the gas phase and the liquid phase being held separate by a (semi-permeable and/or porous) membrane. Although chemical reactions, by means of which the substances to be absorbed are bound, can take place during absorption of the desired constituents in the liquid phase used as absorbent, this technique cannot be used for GLS reactions, inter alia because with this process the gas phase and the liquid phase must be kept strictly separate. Furthermore, in membrane gas absorption the chemical reaction takes place only after the substance(s) to be absorbed has/have passed through the membrane, i.e. into the lumen of the hollow fibres.

R. Brambach and N. Räbiger, Chemie-Ingenieur-Technik, Volume 66, No. 3, March 1994, pages 362–365 describe a biological reactor for converting substances which are difficult to biodegrade. This reactor comprises a suspension membrane reactor consisting of a multiplicity of membrane modules, wherein each module "aus einer der Reaktionsraum umschliessenden Tubularmembran aus Polyacrylnitril $d_{1=14.2}$ mm mit A=0.05 m² besteht" ("consists of a tubular membrane of polyacrylonitrile, $d_{1=14.2}$ mm where A=0.05 m², which encloses the reaction chamber"). This reactor is supplied with compressed air via a distributor unit at the bottom.

However, the reactor in this article is a biological reactor and not a three-phase reactor for GLS reactions. Furthermore, according to FIGS. 1 and 2 in this article, the biological reaction takes place within the membranes/fibres; there is no reaction chamber located outside the fibres. This can also be seen from the fact that according to this literature citation the reaction mixture (that is to say the liquid phase) is both fed and removed via the hollow fibres, whilst according to the Application the hollow fibres provided in the reaction chamber serve only for removal of the liquid phase containing reaction products; the reactor is provided with a separate feed, connected to the reaction chamber, for the (liquid or dissolved) starting materials.

Furthermore, as can be seen from FIG. 4 of said article, the fibres are not located horizontally and/or transversely to the direction of the gas stream; it is therefore not possible to achieve transverse flow onto the fibres. Finally, neither the use of ceramic fibres nor the use of heat exchange elements provided in the reactor is described or suggested.

European Application 0 659 694 likewise describes a biological reactor, specifically for the treatment of polluted water. These reactor is provided with a gas lift system for circulating the liquid phase, the membrane elements arranged in the reactor, which open into the reaction chamber, appearing to serve solely for guiding the circulating liquid phase and not for removing the reaction products. Moreover, once again it is not possible to achieve transverse flow onto the fibres, whilst the use of ceramic fibres or heat exchange elements is also not described.

A general problem which confronts those skilled in the art when using membranes for GLS reactions is that, on the one hand, the solid phase—which preferably is in the form of small particles in order to provide as large as possible a contact surface—has to be held in suspension, so that said phase does not settle out; and that, on the other hand, said small particles must be prevented from clogging (the pores of) the membrane, which would impede the throughput of liquid medium through the reactor. This problem is intensified because during use of the reactor there will be a net liquid flow through the walls of the fibres, which flow "draws along" the solid particles to/against the membrane.

All of this is probably the reason why the use of hollow fibres in GLS reactors has to date not been proposed in the prior art. A further aim of the invention is, therefore, to offer a solution to these specific problems.

SUMMARY OF THE INVENTION

A first aspect of the invention therefore relates to a reactor for carrying out gas phase/liquid phase/solid phase reactions, comprising
 a housing (1) which encloses an essentially closed reaction chamber (2) for holding a first liquid phase, the solid phase and a gas phase (fed through said chamber);
 at least one feed (3), connected to the reaction chamber (2), for feeding a first liquid phase to the reaction chamber (2);
 at least one hollow fibre (4), the wall of which defines an internal flow channel (5) for at least removing a second liquid phase, such that exchange of matter can take place between the reaction chamber (2) and the flow channel (5) through the wall of hollow fibre (4);
 at least one discharge (6), connected to the flow channel (5), for removing the second liquid phase;
 at least one gas inlet (7) and at least one gas outlet (8), connected to reaction chamber (2) such that, in the use position, the at least one gas inlet (7) opens essentially into the bottom of the reaction chamber (2) and the at least one gas outlet (8) is located essentially at the top of the reaction chamber (2), for feeding the gas phase essentially in the upward direction through the reaction chamber (2).

A second aspect of the invention relates to a method for carrying out gas phase/liquid phase/solid phase reactions in a reactor of the type described above, comprising
 holding the solid phase in the reaction chamber (2);
 feeding at least the first liquid phase through the at least one feed (3) to the reaction chamber (2);
 feeding the gas phase to the reaction chamber (2) through the at least one gas inlet (7) and removing the gas phase through the at least one gas outlet (8);
 removing the second liquid phase through the flow channel (5) of the at least one hollow fibre (4) to the discharge (6);
 under conditions such that at least one chemical reaction takes place in the reaction chamber (2) and that at least part or at least one constituent of the first liquid phase passes through the wall of the hollow fibre (4) and is removed with/as the second liquid phase through flow channel (5) to discharge (6).

BRIEF DESCRIPTION OF THE DRAWINGS

The invention will now be explained in more detail on the basis of the description given below and with reference to the appended FIGS. 1–3, in which.

DETAILED DESCRIPTION OF THE INVENTION

The housing (1) of the reactor can be made of any suitable material which is inert under the reaction conditions and/or is able to withstand the conditions, solvents, reactants, temperature and pressure used for the reaction. The requirements which said materials have to meet are as a rule less stringent than those for the materials which are used in membrane reactors for gas phase reactions, in which, in general, very high temperatures (>500° C.) and/or very high pressures are used.

Normal temperatures and pressures for use with the reactor of the invention will be between, respectively, the melting point and the boiling point of the liquid phases used, i.e. −50 to 500° C., and pressures between sub-atmospheric pressure to several atmospheres (in which context it will be clear to those skilled in the art that when the reaction is carried out under a higher pressure the boiling points of the liquid phases used will be at a higher temperature). The reactor according to the invention can therefore be designed for use at such elevated temperatures and/or pressures.

The reactor according to the invention can, for example, be made of metal, glass or suitable plastics. The joints, connections, seals, and the like (such as the material which is used for fixing the ends of the hollow fibres (4) in the housing (1) (the "potting" material)) likewise do not have to meet very particular specifications and/or have very particular characteristics.

The shape and dimensions of the reactor are not an essential feature, although preferably an essentially cylindrical or parallelepiped-shaped reactor vessel is used, preferably a cylindrical reactor vessel or a parallelepiped-shaped reactor vessel of rectangular cross-section. The dimensions of the reactor can in general be freely chosen, depending on the desired scale.

The hollow fibres (4) can be made of any suitable material which is inert under the reaction conditions and which is able to allow the passage of the substances which are to be removed. Suitable materials include both porous and non-porous and semi-permeable materials. Suitable materials are, for example, plastics, such as polyethene, polypropene, polysulphone, PTFE and the like, as well as metals.

The hollow fibres (4) can also be made of composite materials and/or can be coated membranes, such as membrane materials coated with siloxane rubber, and can also be asymmetric membranes, such as polyimide or polyphenylene oxide (PPO) membranes.

However, the hollow fibres (4) are preferably made from a ceramic material; the use of this material gives the advantage of greater resistance to elevated temperatures and elevated pressures and/or greater chemical resistance. More particularly, ceramic hollow fibres such as are obtained in accordance with the method described in International Patent Application 94/23829, the contents of which are incorporated herein by reference, are used. The international application describes the use of such hollow fibres for microfiltration, ultrafiltration and gas separation, but not the use thereof in chemical reactions, and makes no mention at all of the use thereof in GLS reactions or GLS reactors.

A further aspect of the invention therefore relates to the use of ceramic hollow fibres, more particularly the fibres according to International Patent Application 94/23829, for carrying out chemical reactions, more particularly gas phase/liquid phase/solid phase reactions, or in a reactor according to the invention or in a method according to the invention.

The hollow fibres (4) are preferably made of a material which is permeable only to one or more intended substances, in particular only to the reaction products, optionally in combination with solvent, but not to the starting materials. In this way a separation of the starting materials from the reaction products can already be achieved in the reactor and any equilibrium reactions carried out in the reaction chamber (2) can also proceed further to the product side. A downstream separation step for separating off the reaction products from the other constituents of the reaction mixture, and in particular from residual starting materials and the solid phase, is then no longer required; any remaining solvent can be removed simply by evaporation.

Although the invention is not restricted to specific dimensions of the hollow fibres (4), the latter preferably have an (external) diameter of 0.05–7 mm, preferably 0.1–3 mm, and an internal diameter which is such that the second liquid phase can be readily removed. In this context polymer fibres will as a rule have the advantage of having a smaller diameter (up to 0.05 mm) than ceramic hollow fibres. In this context it will be clear that a small diameter provides a larger specific surface area of the fibres in the reactor, whilst a larger internal diameter sometimes is able to provide better flow through the hollow fibres; a person skilled in the art will be able to choose an optimum diameter for the fibres.

If porous hollow fibre membranes are used, these preferably have a pore diameter of 0.5 $\mu$m or less, which makes it possible to use particles having a diameter of from about 1 $\mu$m as the solid phase without said particles passing through the wall or the pores of the hollow fibre (4) and being removed with the second liquid phase. In this way, the hollow fibres (4) also ensure that the (particles of the) suspended solid phase cannot be removed with the second liquid phase and therefore can be held in the reaction chamber (2). This means that, for example, pumping of said particles can be dispensed with and the associated energy consumption, as well as wear on the particles, are prevented.

The number of hollow fibres (4) in the reactor is not limited and in general will depend on the size of the reactor chamber (2) and the desired throughput. According to a preferred embodiment, the reactor chamber (2) contains at least one assembly of hollow fibres (4) with 10 to 1,000,000, preferably 1,000 to 100,000 hollow fibres (4) per assembly.

The hollow fibres (4) in an assembly are preferably uniformly distributed through the reactor chamber (2), more preferentially run essentially parallel and particularly preferentially are located in a plane essentially perpendicular to the gas flow through the reaction chamber (2), that is to say in an essentially horizontal plane in the use position.

It is also possible for the reaction chamber (2) to contain several assemblies of hollow fibres (4). In this context it is possible for the different assemblies to run essentially parallel, it being possible for the flow through said assemblies to be in the same direction or in opposite directions; furthermore, the assemblies can be at an angle with respect to one another, preferably a right angle. In essence, the same applies in respect of the (assemblies of) hollow fibres (9) for heat exchange which are mentioned below.

If the reactor is provided with one or more assemblies of hollow fibres (4), the reactor can be provided with one or more chambers (6a) and/or (11a), connected to the flow channels (5) of the hollow fibres (4), for, respectively, collecting and feeding the second liquid phase at each assembly of hollow fibres (4), as will be described in more detail below.

The reactor according to the invention preferably contains one or more heat exchange elements (9) for supplying heat to the reaction chamber (2) and/or the substances present therein, in particular the first liquid phase. The heat exchange elements will be used in particular for supplying heat when the reaction carried out in the reactor is endothermic, or for supplying heat to accelerate the reaction. It will be clear to a person skilled in the art that a heating element known per se can also be used for this purpose.

The heat exchange element (9) can also be used for removing heat of reaction, in particular when the reaction carried out in the reactor is exothermic. In this way it is possible to control the temperature in the reactor and/or to prevent the temperature in the reactor, or the temperature of one of the phases present in the reactor, from (locally) becoming too high.

It will therefore be clear to a person skilled in the art that for the practical implementation of the invention it is preferable to provide the reactor with heat exchange elements such that the same elements can be used both for supplying heat to and for removing heat from the reactor, as desired.

The heat exchange elements are preferably constructed as an assembly of hollow fibres (9), so that as large as possible a surface is provided for heat exchange. The wall of each hollow fibre (9) defines an internal flow channel (10) for feeding through a fluid for heat exchange, such that heat exchange can take place between the reaction chamber (2) and/or the phases present therein and the fluid for heat exchange which is flowing through the flow channel (10). With this arrangement the ends of the hollow fibres (9) will usually open into a feed or discharge for the fluid (not shown), which can optionally be connected to further heat exchange elements, heating elements and the like.

The hollow fibres (9) can be made of any suitable material, but in particular are made of a suitable metal, or of a ceramic material, more particularly the ceramic hollow fibres according to the abovementioned International Patent Application 94/23829. The reactor can also be provided with means for distributing or collecting the fluid for heat exchange over the assembly of hollow fibres (not shown).

The hollow fibres for heat exchange (9) are preferably uniformly distributed over the entire reaction chamber (2), are preferably located in a plane essentially perpendicular to the direction of the gas flow and preferably run essentially parallel, as described above.

It will be clear to a person skilled in the art that the hollow fibres (9) which are used for heat exchange do not have to be, and preferably are not, permeable to any components in the reaction chamber (2). However, it is also possible to use permeable or semi-permeable fibres, where, for example, the inert fluid for heat exchange is not miscible with the first liquid phase and is also not able to absorb any constituents therefrom.

Furthermore, the heat exchange fibres (9) can be used to heat one or several reactants.

Figure 2:
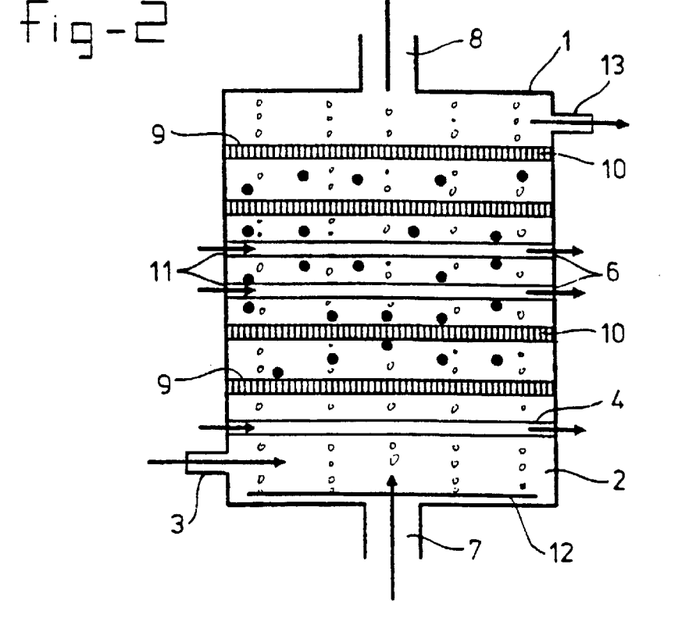
FIG. 2 shows a reactor and an embodiment of the invention in which the hollow fibres are used for feeding a second liquid phase through the reactor.

It must also be understood that in the case of the embodiment in FIG. 2, where a second liquid phase is fed through the hollow fibres in order to extract/absorb one or more constituents from the first liquid phase, said second liquid phase can also be used for absorbing heat from, or removing heat from, the reaction chamber (2) and/or the first liquid phase.

The temperature in the reactor can, for example, also be controlled by feeding through a (pre-)heated or cooled gas phase, or by preheating or cooling the liquid supplied, in each case with respect to the temperature in the reactor chamber (2), it being possible to control the temperature by controlling the flow rates.

Furthermore, it is possible to use any suitable method for controlling the temperature, such as controlling the rate of reaction in the reactor, for example by controlling the feed rate of the reactants and/or the concentrations thereof. In general, a person skilled in the art will be able, partly on the basis of the present description, to control and/or to optimize the temperature in the reactor in a suitable manner.

When the reaction chamber (2) contains several (assemblies of) hollow fibres (4) and/or (9), the distance between the individual hollow fibres and the location of the latter with respect to one another are preferably such that the hollow fibres (4) and/or (9) do not substantially impede throughput and/or mixing in the reaction chamber (2), in particular such that the desired, essentially upward, gas flow and the desired turbulent flow of the first liquid phase, as described in more detail below, can be obtained; it is also preferable that the particles of the solid phase are able to move freely through the reaction chamber (2).

In the context of the present application, the "first liquid phase" is understood to be the liquid phase which is located in the reaction chamber (2) outside the hollow fibres (4) and/or (9); furthermore, the term "first liquid phase" is used to define the liquid which is fed to the reaction chamber (2) via one or more feeds (3).

It will be clear that the reaction will in general take place in said first liquid phase, with the result that the composition of the liquid phase will change, depending on, for example, the degree of conversion and/or the location in the reactor.

In general, the term "first liquid phase" as used here includes any solvents, the starting materials dissolved therein or mixed therewith, and the reaction products dissolved therein or mixed therewith, as fed to, present in and/or formed in the reaction chamber (2) and as long as these have not yet passed through the wall of the hollow fibres (4) to the flow channel (5).

The "first liquid phase" can also comprise a mixture of several liquids which are fed simultaneously or individually by means of one or more feeds (3) connected to the reaction chamber (2). It is also possible for the first liquid phase to be a suspension, in particular a suspension of the finely divided solid phase.

The composition of the first liquid phase is therefore not particularly restricted and will depend, for example, on the starting materials used and the reaction carried out in the reactor. However, the first liquid phase will as a rule contain the suspended solid phase.

The term "second liquid phase" is in general understood to define the liquid phase which is present in the one or more flow channels (5) of the one or more hollow fibres (4).

The second liquid phase can originate from or can be derived from the first liquid phase, that is to say can contain one or more constituents of the first liquid phase which have passed through the wall of the hollow fibre (4) and are removed as second liquid phase.

The second liquid phase can also be a liquid which is fed through the hollow fibres (4) independently of the first liquid phase, in particular in the embodiment in FIG. 2. In this case the second liquid phase will preferably be an agent which is able to absorb, take up or extract one or more desired substances from the first liquid phase through the wall of the hollow fibres (4).

The second liquid phase can therefore contain one or more solvents, as well as starting materials, reaction products and substances for the absorption and/or binding of one or more substances from the first liquid phase. The composition of the second liquid phase is therefore also not particularly restricted and will be dependent on the reaction carried out in the reactor, the properties of the membrane, etc.

As described in more detail below, the second liquid phase will preferably contain one or more reaction products, but no starting materials or a reduced content of starting materials, so that separation of the starting materials and the reaction products is already achieved in the reactor itself and any equilibrium reactions carried out in the reaction chamber (2) are also able to proceed to the product side.

The gas phase is fed via the one or more gas inlets (7) and removed via the one or more gas outlets (8). The at least one gas inlet (7) and the at least one gas outlet (8) are connected to reaction chamber (2) such that, in the use position, the at least one gas inlet (7) essentially opens into the bottom of the reaction chamber (2) and the at least one gas outlet (8) is essentially located at the top of the reaction chamber (2), in order to feed the gas phase through the reaction chamber (2) essentially in the upward direction. In this context it will be clear that what is required for this, in the broadest sense, is that the gas inlets (7), in the use position, open into the reaction chamber (2) at a lower position than the one or more gas outlets (8); the at least one gas inlet (7) will usually open into or close to the bottom of the reactor, whilst the at least one gas outlet (8) is in or close to the roof of the reactor; the at least one gas inlet (7) and/or the at least one gas outlet (8) can, however, also be provided in the side wall of the reactor.

According to the invention, the gas phase is fed through the reaction chamber (2) in such a way that a turbulent flow of the first liquid phase in the reaction chamber (2) is obtained.

This turbulent flow gives the following advantages, individually and/or in combination:
  the solid phase is held in suspension in the first liquid phase;
  thorough mixing of the first liquid phase, or the first liquid phase and the solid phase, takes place, as a result of which a homogeneous distribution of the liquids and/or the solid phase over the reaction chamber (2) is obtained, and the production of adverse gradients and/or local heat generation is prevented;
  as a result of the turbulent flow in the reactor and/or the mixing effect of the gas phase fed through, it is also possible to use solid phase particles of a higher density, which otherwise would settle to the bottom of the reactor;
  as a result of the turbulent flow in the reactor, caking of the solid phase on the one or more hollow fibres (4) is prevented, which guarantees good through-flow of liquid through the reactor;
  mixing by means of the gas stream gives rise to less wear of the solid particles, compared with, for example, stirrer devices.

A powerful gas stream can be used to obtain the turbulent flow in the reactor. The one or more gas inlets (7) can also be so provided that a turbulent flow is obtained. Finally, it is possible for the reactor to be provided with one or more elements (12) for guiding and/or distributing the gas flow, such as a distributor plate at the bottom of the reactor. These measures can also be used in combination.

The use of distributor elements for the gas stream also has the further advantage that the gas stream is fed in the form of (relatively) small bubbles through the reaction chamber (2) and the first liquid phase, so that the surface area for contact and exchange between the gas phase and the first liquid phase is enlarged, which can promote the reaction.

A person skilled in the art will in general be capable of so designing the reactor—or of so controlling the conditions employed—in particular the gas speed and the gas flow rate—that the desired turbulent flow and the desired fine distribution of the gas flow are obtained.

Figure 1:
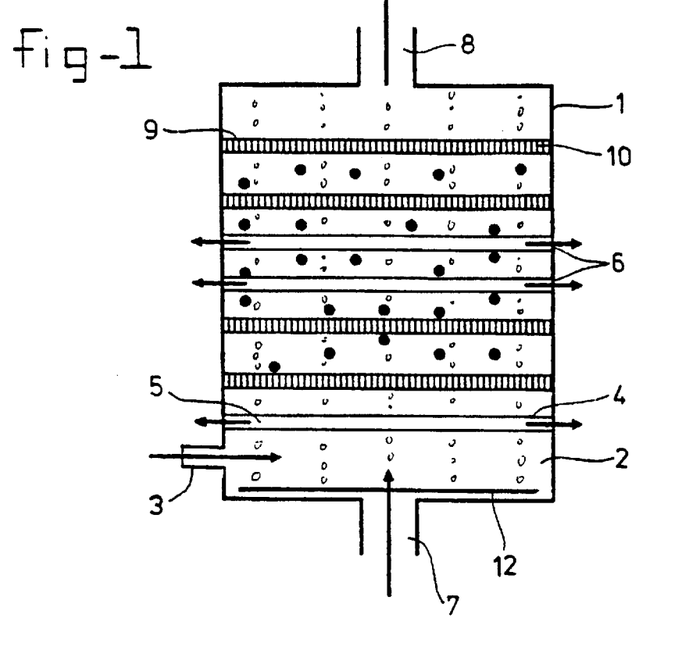
FIG. 1 shows a reactor and an embodiment of the invention in which the hollow fibres are used for removing the second liquid phase from the reactor.

With reference to FIG. 1, a first preferred embodiment of the reactor and the method of the invention is as follows.

The first liquid phase is fed via the one or more feeds (3) to the reaction chamber (2) in which the solid phase is present, preferably in the form of small particles (indicated by black dots) which are suspended or are held in suspension in the first liquid phase. A gas phase is fed simultaneously to the reaction chamber (2) via the one or more gas inlets (7), an essentially upward gas flow through the reaction chamber (2) being obtained. The upward flow is preferably such that mixing or a turbulent flow of the first liquid phase is obtained, which contributes to holding the solid phase in suspension.

As a result of the starting materials, which are fed to the reaction chamber (2) with the first liquid phase and/or with the gas phase, coming into contact with the solid phase present in the reaction chamber (2), the one or more chemical reactions occur, the starting materials being converted to the reaction products. As a result, the composition of the first liquid phase changes.

The reaction products, optionally together with solvent, pass through the wall of the hollow fibre (4) and come into the flow channel (5), where they form the second liquid phase. This liquid phase is removed through discharge (6), connected to flow channel (5). For this purpose the hollow fibres (4) can be connected by only one end thereof to discharge (6), the other end of the hollow fibre being closed off, but the hollow fibres are preferably connected at both ends to one or two individual discharge(s) (6) in order to achieve optimum removal of the second liquid phase from the reactor. Most preferentially, the hollow fibres (4) are connected at both ends to two (individual) discharges (6), so that liquid can be withdrawn from the flow channel (5) in opposite directions.

The second liquid phase is then further removed and the desired products are separated off. The residual fraction can optionally be re-fed to the reactor as part of the first liquid phase.

The excess gas phase collects at the top of the reactor and is removed via the one or more gas outlets (8). From here the gas phase can optionally be recirculated to gas inlet (7).

During the reactions, heat can be supplied to or removed from the reaction chamber (2) by means of the one or more heat exchange elements, in particular hollow fibres (9), through which a fluid is fed for heat exchange.

The reactor can furthermore be provided with at least one discharge (not shown in FIG. 1) for the removal of surplus first liquid phase, in particular at the top of the reaction chamber (2). This discharge can, in turn, be connected to the one or more feeds (3), preferably by means of a pump, for recirculation of the first liquid phase to increase the efficiency. This discharge is particularly preferentially also constructed as a (separate) assembly of hollow fibres as described above.

A second preferred embodiment of the invention, shown in FIG. 2, is as follows. A separate second liquid phase is fed via feed (11), connected to hollow fibres (4), to flow channel (5) and at the other end of hollow fibre (4) is removed via discharge (6). With this arrangement, a second liquid phase is such that said phase is able to take up, absorb or extract one or more desired components from the first liquid phase through the wall of the hollow fibre (4). The second liquid phase is further removed from discharge (6), after which the desired products are separated off; the residual extractant can then be recirculated to feed (11). In other respects this embodiment is essentially the same as the first embodiment described above, with the proviso that the reactor is preferably provided with one or more discharges (13) for the first liquid phase (optionally provided with means, such as a grating or filter, to prevent the solid phase being entrained with the first liquid phase discharged), so that continuous throughput of the first liquid phase through the reactor is possible.

The discharge (13) is particularly preferentially constructed as at least one (separate) assembly of hollow fibres in the reactor. According to this embodiment, the reactor therefore has at least two separate assemblies of hollow fibres, specifically a first assembly for feeding through the second liquid phase and extracting the desired products, and a second assembly for removing excess first liquid phase, as well as, preferably, at least a third assembly for heat exchange.

Although the invention in the broadest sense comprises the reactor and method described above, the invention also relates to a reactor and method which offer appreciable advantages from the standpoint of efficiency and conversion as well as from the standpoint of process technology. According to this embodiment, shown in FIG. 3, the hollow fibres (4) form an assembly which is connected to a chamber (6a) such that the flow channels (5) of the first assembly of hollow fibres (4) open into said chamber to enable collection of the second liquid phase. With this arrangement, chamber (6a), which is preferably located in the wall of the reactor, is provided with at least one discharge (6b) for removal of the collected second liquid phase from the chamber (6a). This embodiment can therefore be interpreted such that the discharge (6) is formed from chamber (6a) and discharge (6b).

Figure 3:
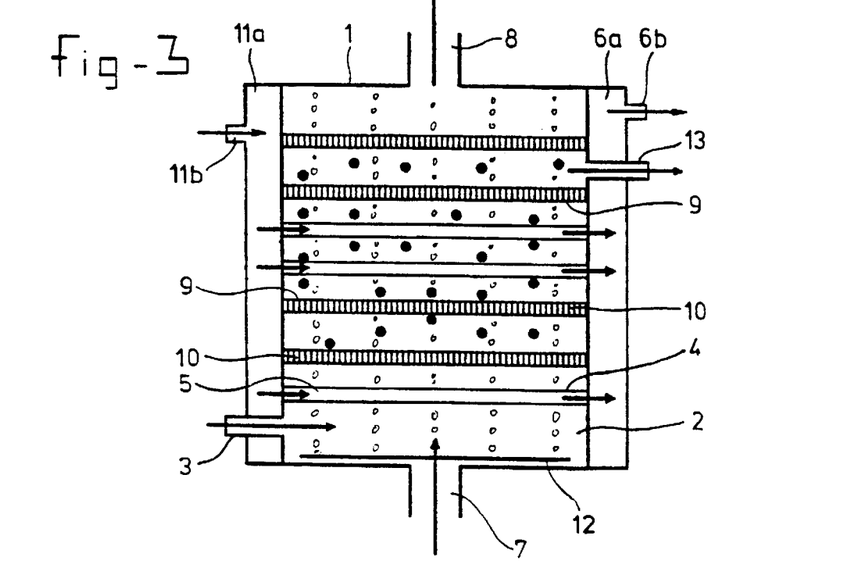
FIG. 3 shows a reactor according to the invention which is provided with means for collecting or feeding through the second liquid phase.

When the reactor and the method are operated in accordance with the first embodiment outlined above, the two ends of the first assembly of hollow fibres (4) will open into two separate chambers (6a), as will be clear to a person skilled in the art.

When the reactor and the method are operated in accordance with the second embodiment described above, the first assembly of hollow fibres (4) is provided at one end thereof with a chamber (6a) with discharge (6b), whilst the assembly of hollow fibres (4) at the other end is connected to a chamber (11a) for distributing the second liquid phase over the flow channels (5) of the first assembly of hollow fibres (4), chamber (11a) being provided with at least one feed (11b) for feeding the collected second liquid phase to the chamber (11a). This embodiment must therefore be interpreted such that the feed (11) is formed by chamber (11a) and feed (11b) taken as a whole.

Figure 4:
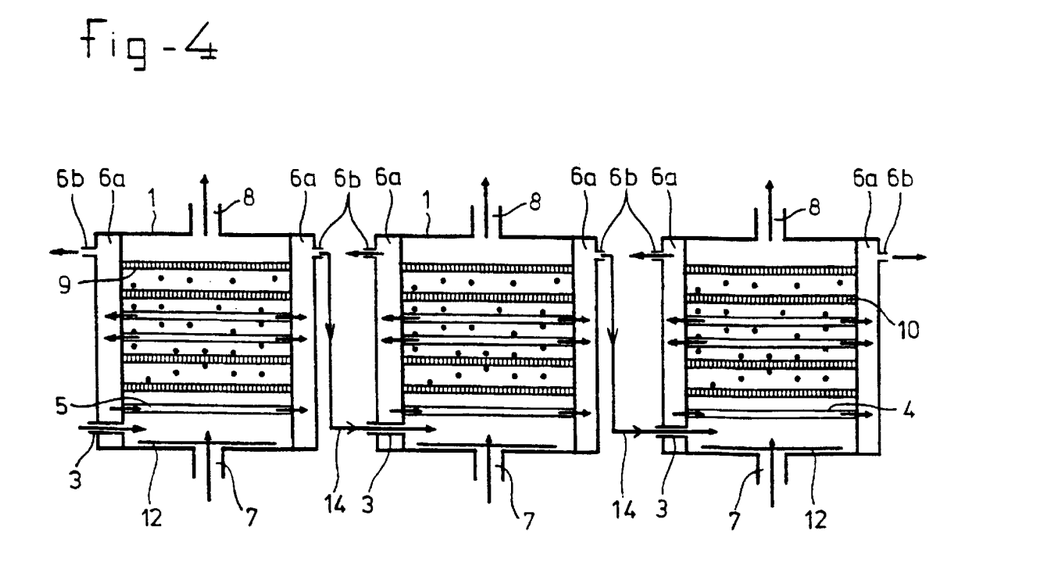
FIG. 4 shows an embodiment of the invention which comprises several reactors connected in series.

Furthermore, it is possible for several reactors as described above to be connected in series, for example as shown in FIG. 4. As a result of the "staging" effect obtained in this way, high conversion can be achieved in a simple manner.

FIG. 4 shows several reactors connected in series, the discharges (6a/6b) of which are connected via one or more lines (14) to the at least one feed (3) of a subsequent reactor. (For the sake of clarity, in the figure only one of the two discharges (6a/6b) per reactor is shown as connected to line (14)/feed (3); in practice both discharges will be connected). The first liquid phase from the first reactor is removed via the hollow fibres (4), flow channel (5) and discharge (6a/6b) as the second liquid phase from the first reactor and then fed via line (14) and feed (3) as the first liquid phase to the second reactor, from which said first liquid phase is, in turn, removed as second liquid phase via discharge (6a/6b) to the following reactor.

In this context it is pointed out that plug flow is frequently desirable for optimum conversion in a reactor. In practice, however, in virtually all types of reactors axial mixing will occur, as a result of which the average concentration of reactants in the reactor decreases at a given final conversion, which is to be achieved. As a result, the production per unit volume of the reactor falls. In the membrane reactor according to the invention as well it is possible for powerful axial mixing to occur, in particular in very large-scale reactors. The disadvantages of this can, however, be compensated for by connecting several reactors in series instead of using one large reactor.

In the case of series connection as described above, the concentration of product(s) formed will increase with each subsequent reactor in the series, whilst the quantity of reactant(s) decreases with each subsequent reactor in the series. Taken overall, the result of this is that it is possible to work with a higher concentration level of the reactants than would be the case if the reaction were carried out in one large reactor. After all, assuming ideal mixing—which is closely approximated in the reactor according to the invention—the reactant concentration which would prevail everywhere in the reactor when carrying out the reaction in one reactor would be that which would be achieved only in the final reactor in the case of several reactors connected in series. This means that the effect of axial mixing is restricted and that a higher conversion per unit volume can be achieved in all the upstream reactors.

The reactor construction described above furthermore makes it possible for the reactor to be assembled from one or more modules, in the sense that the discharge (6b) of a first module is connected to the feed (11b) of a subsequent second module connected in series therewith, it optionally being possible, in turn to connect the respective discharge (6b) of said second module to a feed (11b) of a subsequent module.

A configuration of this type is disclosed in International Patent Applications 91/09668 and 94/012067, which are incorporated herein by reference. The (modular) installations described in these publications are in general, and herein, designated as a "transverse feed module" or "dwarsgestroomde module" ("DAM").

However, it must be understood that although the reactors according to the present invention which are preferably used essentially correspond to said DAM-module as far as the manner of feeding the second liquid phase through the assemblies of hollow fibres (4) is concerned, there are a number of essential differences between the reactor of the present application and the DAM-module of international Patent Applications 91/09668 and 94/012067, which differences are related to the use of the present reactor for GLS reactions and to the location of the various elements of the reactor in the use position. These differences are, inter alia:

the reactor according to the application is provided both with means for feeding the first liquid phase to the chamber outside the fibres and with means for feeding the gas phase to said chamber;

according to the invention, the hollow fibres (4) are made of a material which is inert under the reaction conditions, preferably a ceramic material;

according to the application, it is obligatory that, in the use position, the at least one gas inlet (7) is located at the bottom of the reactor, whilst the at least one gas outlet is located at the top of the reactor;

according to the invention the successive hollow fibre modules are preferably stacked on top of one another in essentially parallel, horizontal planes.

The DAM-module according to the International Applications is not provided with such a combination of gas feed and liquid feed; the flow of the medium outside the fibres is essentially horizontal, to which end the fibre modules are positioned one behind the other in horizontal planes. This means that the feeds and/or discharges, which are connected to the chamber outside the fibres, are essentially located at the same height.

Furthermore, neither of the International Patent Applications discloses or suggests that the installation described therein can be used for chemical reactions, and certainly not for GLS reactions.

It is true that the reactor according to the present application, which is preferably used, does have modular construction in common with the DAM-module and that the flow of the medium present outside the fibres (gas phase+ liquid phase) is perpendicular to the direction of the fibres, or to the direction of flow of the second liquid phase therein, so that the advantages associated with this are obtained, as described in the International Patent Applications, which are included herein by reference.

The reactor and the method according to the invention can be used for all GLS reactions, including, in particular, phase transfer reactions, as hitherto carried out in known types of reactor. On the basis of the abovementioned description, a person skilled in the art will be able to make any modifications required for this and said modifications fall within the scope of the invention.

The reactor according to the invention is particularly suitable for applications in which very small catalyst particles are used, that is to say applications for which suspension reactors are currently used.

A few non-limiting examples of possible reaction (types) are:

solid-phase-catalyzed hydrogenation or oxidation in an organic medium, including cooling;

the performance of equilibrium reactions, the selective removal of the reaction products making it possible to shift the equilibrium in the direction of said products.

For all of these applications the reactor according to the invention offers the following advantages, individually and/or in combination:

The solid phase can be held in the reactor in a simple manner without the flow of liquid phase through the reactor being impeded. As a result, the use of expensive pumps, which require energy and can lead to wear of the catalyst particles, can be avoided and longer operating cycles are obtained.

The use of the turbulent gas flow renders superfluous the use of internal mechanical stirrer devices which require energy and can damage the particles of the solid phase; optionally even a "gas lift" effect can be obtained and/or use can be made of differences in hydrostatic pressure, for example as a result of liberated heat or the formation of reaction products.

The solid phase can simply be removed from the reactor and/or replaced. For instance, it is possible partially or continuously to replace the solid phase, in particular for regeneration, without the entire reactor having to be shut down for this purpose, as is the case with conventional fixed bed reactors. A constant activity of the catalyst can also be ensured by this means.

The membrane reactor enables very good control of the reaction conditions, such as feeding and removal of reaction products, virtually completely free and independent choice of the flow rates, accurate control of reaction temperature and pressure, and the like.

As a result of the use of hollow fibres, the total surface area which is available for absorption of desired constituents and/or solvent from the reaction chamber (2) is increased (surface area/volume ratios of >1,000 $m^2/m^3$ are possible), as a result of which the latter can be better removed, which, for example, enables better throughput of the reactor and higher flow rates per unit time.

By feeding through the gas phase, a turbulent flow of the first liquid phase is obtained, as a result of which the solid phase can be held in suspension in the first liquid phase, larger catalyst particles can be used and good mixing in the reactor is obtained without the occurrence of local concentration gradients or local overheating; in addition, clogging of the (pores of the) hollow fibres membranes can be prevented.

By using membranes with very small pores, very small particles can be used as the solid phase, as a result of which the total surface area of the solid phase which is available for reaction is increased. This, in turn, at high reaction rates, can enable the use of smaller reactors, it being possible for the optimum efficiency of the catalyst particles to be approximated because the diffusion limitation of the catalyst particles is minimized.

The reactor can be operated with higher solids concentrations/contents than is customary, as a result of which the residence time of the liquid phase in the reactor can be limited, by which means undesired side and subsequent reactions can also be limited.

By connecting several reactors in series a high conversion can be achieved and the effect of axial mixing can be restricted.

The reactor of the invention makes it possible continuously to extract the reaction medium (the first liquid phase) with a separate second liquid phase, which makes it possible selectively to remove desired substances, such as reaction products, from the reactor.

Finally, it must be understood that although, in general, when carrying out GLS reactions in accordance with the invention the one or more starting materials will be fed with/as the first liquid phase and/or the gas phase, the solid phase acting as catalyst, the invention is not restricted to this.

For instance, it is also possible to feed the one or more starting materials exclusively with the first liquid phase, said starting materials coming into contact with the catalyst solid phase in the reaction chamber (2). The gas phase, which is inert under these conditions, will then serve only for mixing of the first liquid phase, holding the solid phase in suspension and/or maintaining a good throughput of the first and second liquid phases.

It is also possible, for example, to carry out crystallisation using the reactor according to the invention, the mother liquor forming the first liquid phase, the growing crystals/crystal nuclei forming the solid phase and the gas phase also not being involved in the reactions.

Furthermore, although the hollow fibres (4) according to the invention will preferably be made from a material which is inert under the reaction conditions, it is not precluded that the hollow fibre material is involved as a catalyst in the reaction, or supports a catalytic constituent. However, it is very much to be preferred that the fibre material is inert and that the catalyst material is present as a separate solid phase, since this makes it possible simply to remove the catalyst material from the reactor, which greatly facilitates maintenance of the reactor and regeneration of the catalyst. Furthermore, this makes it possible to use the reactor—successively—for different chemical reactions.

Other advantageous applications of the method and the reactor of the invention and any modifications required for this will be apparent to a person skilled in the art and fall within the scope of the application.

What is claimed is:

1. Reactor for carrying out gas/liquid/solid phase reactions, comprising:

a housing which encloses an essentially closed reaction chamber for holding a first liquid phase, a particulate solid phase and a gas phase;

at least one feed, connected to the reaction chamber, for feeding a first liquid phase to the reaction chamber;

at least a first assembly of a multiplicity of first hollow fibers having a wall which defines an internal flow channel for at least removing a second liquid phase, such that exchange between the reaction chamber and the flow channel can take place through the wall of the hollow fibers, said hollow fibers being located in a plane essentially perpendicular to the direction of gas flow;

at least one discharge, connected to the flow channel, for removing the second liquid phase;

at least one heat exchange element for supplying heat to, or removing heat from, the reaction chamber; said heat exchange element comprising a second assembly of second hollow fibers, each having a wall which defines an internal flow path for feeding a heat exchange fluid therethrough, such that heat exchange between the reaction chamber and the heat exchange fluid flowing through the flow path can take place; each of the second hollow fibers having a first end which communicates with a heat exchange fluid inlet, and a second end which communicates with a heat exchange fluid outlet;

at least one gas inlet and at least one gas outlet, connected to the reaction chamber, such that in use, the at least one gas inlet opens essentially into the bottom of the reaction chamber for feeding the gas phase essentially in the upward direction through the reaction chamber, and the at least one gas outlet is located essentially at the top of the reaction chamber; and optionally at least one guiding element for distributing the gas phase, wherein the at least one gas inlet and the optional guiding element are structured and arranged such that during use of the reactor, when a gas phase is fed to the gas inlet and into the reaction chamber, a turbulent flow of the first liquid phase is obtained in the reaction chamber.

2. The reactor according to claim 1, wherein the reactor is provided with at least one guiding element for distributing the gas phase, said guiding element being constructed such that, during use, when the gas phase is fed through the gas inlet into the reaction chamber, a turbulent flow of the first liquid phase is obtained in the reaction chamber.

3. The reactor according to claim 1, wherein the first hollow fibers are made of a material which is inert under reaction conditions, said material being one of ceramic, metal, ceramic/metal and metals.

4. The reactor according to claim 1, wherein the first hollow fibers are made of a material which is inert under reaction conditions.

5. The reactor according to claim 1, wherein the first hollow fibers are made of at least one catalytic material for catalyzing a chemical reaction carried out in the reaction chamber.

6. The reactor according to claim 5, wherein the first hollow fibers are made of an insert support, which supports at least one catalytic component for catalyzing the chemical reaction.

7. The reactor according to claim 1, wherein the flow channel has two ends which communicate with the at least one discharge.

8. The reactor according to claim 1, wherein each flow channel of the first assembly of first hollow fibers has a first end which opens into the at least one discharge, and a second end which is connected to a second liquid phase inlet for feeding the second liquid phase through a respective flow channel.

9. The reactor according to claim 8, wherein the at least one discharge is formed by a collection chamber into which the flow channels of the first assembly of first hollow fibers open, for collecting the second liquid phase; the collection chamber being provided with at least one second liquid phase discharge for removing the collected second liquid phase from the collection chamber.

10. The reactor according to claim 8, wherein the second liquid phase inlet is formed by a distribution chamber, into which the flow channels of the first assembly of first hollow fibers open, for distributing the second liquid phase over the flow channels; the distribution chamber being provided with at least one supply means for supplying the collected second liquid phase to the distribution chamber.

11. Method for carrying out gas/liquid/solid phase reactions in a reactor having a housing which encloses an essentially closed reaction chamber for holding a first liquid phase, a particulate solid phase; at least one feed, connected to the reaction chamber, for feeding a first liquid phase to the reaction chamber; at least one hollow fiber having a wall which defines an internal flow channel for at least removing a second liquid phase, such that exchange of matter between the reaction and the flow channel through the wall of the hollow fibers can take place, the hollow fiber being located in a plane essentially perpendicular to the direction of gas flow; at least one discharge, connected to the flow channel, for removing the second liquid phase; at least one gas inlet and at least one gas outlet, connected to the reaction chamber, such that in use, the gas inlet opens essentially into the bottom of the reaction chamber for feeding the gas phase essentially in an upward direction through the reaction chamber, and the gas outlet is located essentially at the top of the reaction chamber; the method comprising:

holding the solid phase in the reaction chamber;

feeding at least the first liquid phase through the at least one feed to the reaction chamber;

feeding the gas phase to the reaction chamber through the at least one gas inlet and removing the gas phase through the at least one gas outlet;

removing the second liquid phase through the flow channel of the at least one hollow fiber to the discharge;

under conditions such that at least one chemical reaction forming reaction products takes place in the reaction chamber, and that at least part or at least one constituent of the first liquid phase passes through the wall of the hollow fiber and is removed with/as the second liquid phase through the flow channel to the discharge.

12. The method according to claim 11, wherein at least one of the reaction products formed during the reaction passes through the wall of the hollow fiber and is removed with/as the second liquid phase.

13. The method according to claim 11, wherein the solid phase is a material in the form of small particles which are suspended in the first liquid phase.

14. The method according to claim 11, wherein the chemical reaction is also exothermic and the heat of reaction produced is removed by a heat exchange element.

15. The method according to claim 14, wherein the reaction chamber or the first liquid phase is heated with the aid of the heat exchange element.

16. The method according to claim 11, wherein a flow of the gas phase through the reaction chamber is maintained such that a turbulent flow of the first liquid phase is obtained in the reaction chamber.

17. The method according to claim 16, wherein the turbulent flow of the first liquid phase is such that the solid phase is held in suspension in the first liquid phase.

18. The method according to claim 11, wherein the reaction takes place between at least one of the constituents of the first liquid phase and at least one of the constituents of the gas phase.

19. The method according to claim 11, wherein the solid phase acts as a catalyst for the reaction.

20. The method according to claim 11, wherein the second liquid phase acts as an extractant for at least one of the constituents of the first liquid phase.

21. The method according to claim 11, wherein the second liquid phase acts as an extractant for at least one of the reaction products, for extracting at least one of the reaction products from the first liquid phase through the wall of the at least one hollow fiber to the second liquid phase.

* * * * *